No. 809,836. PATENTED JAN. 9, 1906.
F. NORDSTROM.
TAILOR'S MEASURE.
APPLICATION FILED AUG. 21, 1905.
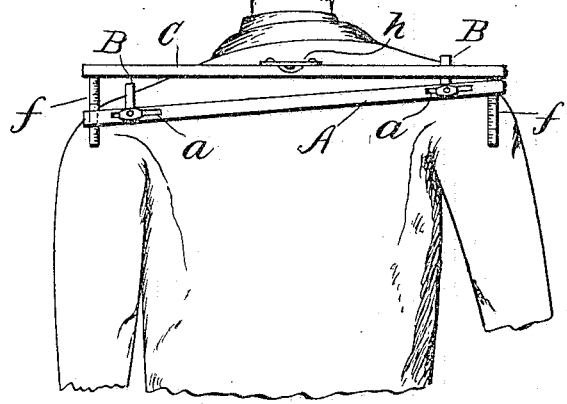
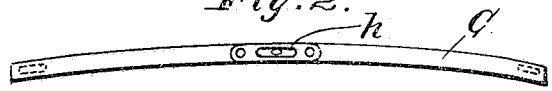
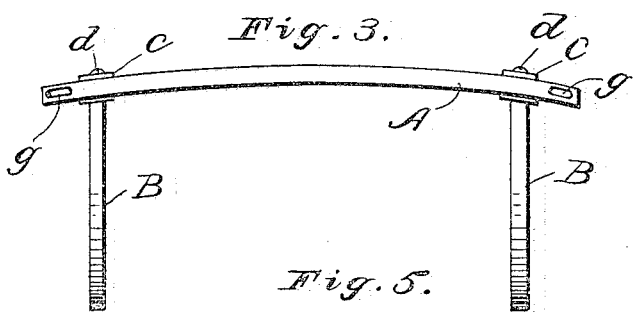
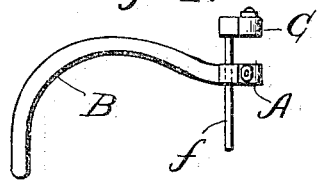
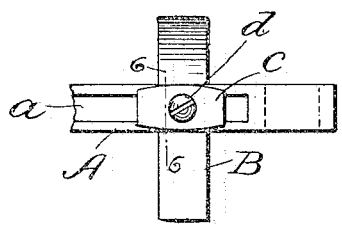
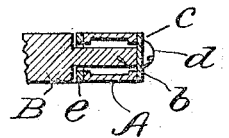
Witnesses
C. Sedgwick
J. M. Howard
By his Attorney
Inventor
Fred Nordstrom
Ernst Lundgren

UNITED STATES PATENT OFFICE.

FRED NORDSTROM, OF NEW YORK, N. Y.

TAILOR'S MEASURE.

No. 809,836.      Specification of Letters Patent.      Patented Jan. 9, 1906.

Application filed August 21, 1905. Serial No. 275,116.

*To all whom it may concern:*

Be it known that I, FRED NORDSTROM, a citizen of the United States, residing in the borough of Brooklyn, city of New York, in the county of Kings and State of New York, have invented certain new and useful Improvements in Tailors' Measures, of which the following, taken in connection with the accompanying drawings, is a full, clear, and exact specification.

The principal object of my invention is to provide or produce a simple, cheap, efficient, convenient, and reliable measure for tailors' use to enable a tailor or measurer to accurately determine or measure the difference in height of the shoulders of a person being measured to insure an accurate fitting about the shoulders.

To accomplish the foregoing object and to secure other advantages in the matters of construction, operation, application, and use, my improvements involve a new and useful instrument of the character above named and certain new and useful peculiarities of construction and relative arrangements or combinations of parts, as will be herein first fully described and then pointed out in the claims.

While my invention is chiefly designed to be used as a tailor's measure, obviously it is applicable for use in determining and measuring the difference in height of the shoulders of a person for any other purpose—as, for instance, to enable the person to correct the defect or to secure a record of the difference for identification purposes.

In the accompanying drawings, forming part of this specification, Figure 1 is an elevation showing my improved instrument applied upon the back and shoulders of an individual, one shoulder (the right one) being represented as considerably higher than the left one and the instrument being in position to indicate or measure the difference in the height of the two shoulders. Fig. 2 is a top view of the upper bar detached; and Fig. 3, a similar view of the lower bar with the shoulder-pieces applied thereon, these bars being faced in a direction opposite that indicated in Fig. 1. Fig. 4 is an end view showing the two bars in position for use. Fig. 5 is a plan view of a fragment of one end corresponding with Fig. 3, but on a larger scale than that figure, showing the manner in which the shoulder-pieces are mounted and made adjustable upon the lower bar. Fig. 6 is a cross-section on a plane through line 6 6 of Fig. 5.

In all the figures like letters of reference wherever they occur indicate corresponding parts.

A represents the lower bar of the instrument, and B the shoulder-pieces adapted to rest upon the shoulders and to sustain the instrument in proper position for use. To adapt the instrument for adjustment for different statures, the shoulder-pieces B are slidably mounted in connection with the lower bar, for which purpose the lower bar is slotted, as at $a\,a$, and the shoulder-pieces provided with tangs, as at $b$, entering the said slots. The sliding piece $c$ bears on the face of the bar A and is secured to the tang $b$ by a suitable screw, as at $d$, or by other equivalent means. That the shoulder-pieces may be adjusted toward and from the center of the bar without unnecessary friction I employ between them and the bar a piece of felt or other suitable substance, as at $e$. This construction is sufficient to insure the easy adjustment of the shoulder-pieces to the proper distance from the center of the bar and to properly fit upon the shoulders and at the same time to insure that they will remain in the position to which they are adjusted during use of the instrument.

The connection between the shoulder-pieces and the bar A is such that when in place upon the person the bar A will incline the same as the shoulders incline—that is, it will indicate a difference in height of the two shoulders, if there be any difference.

C is the upper bar of the instrument, the same being of about the same length as the lower bar and having a similar curve, the bars being slightly curved the better to fit the back of the person. On each end of this bar and depending therefrom are rigidly secured short scales or measures, (represented at $f$,) and the bar A is slotted, as at $g\,g$, to permit the scales $f\,f$ to pass through, the slots being a little wider than the scales, so that the latter may move up and down without interference when either end of the bar C is tilted or elevated.

In the center of the bar A is a spirit or equivalent level of ordinary form, (represented at $h$.)

The instrument being applied on the person while in an erect position, as indicated in Fig. 1, the end of bar C which was lowest has only to be elevated until the spirit-level $h$ indicates that the bar C is level or at the same height at either end. Then the indication on the corresponding scale or measure $f$ at the margin of the other bar is read off and this reading affords an accurate measure for the difference in the height of the two shoulders. This reading being known, it will afford an accurate guide or measure by which the tailor will be enabled to properly and accurately fit the person; or, as before indicated, the measure may be employed for other purposes.

The improved instrument being constructed and arranged for operation substantially in accordance with the foregoing explanations is found to admirably answer all the purposes or objects of the invention hereinbefore alluded to.

Having now fully described my invention, what I claim as new herein, and desire to secure by Letters Patent, is—

1. The herein-described tailor's measure, the same being composed of separate bars, shoulder-pieces applied upon one bar and scales or measures and a level applied upon the other bar, the parts being combined and arranged for operation, substantially as set forth.

2. In a measure of the character herein set forth, the combination with the lower bar of the adjustable shoulder-pieces mounted in connection therewith, said bar being slotted to receive gages or measures, substantially as and for the purposes set forth.

3. In a measure of the character herein set forth, the combination with the lower bar of adjustable shoulder-pieces, said shoulder-pieces being each provided with a tang passing through the said bar, and sliding pieces connected with the tangs, substantially as shown.

4. In a measure of the character herein set forth, the combination with the lower bar having adjustable shoulder-pieces applied thereon, of an upper bar having a fixed gage or measure at each end and having a spirit-level, the parts being arranged and combined substantially as shown.

5. In a measure of the character herein set forth, the combination of two bars curved as explained, the shoulder-pieces adjustably mounted on one of the bars, and the gages or scales mounted on the other bar and arranged to pass through slots in the first bar, substantially as shown and described.

In testimony whereof I have signed my name to this specification in the presence of two subscribing witnesses.

FRED NORDSTROM.

Witnesses:
C. SEDGWICK,
J. M. HOWARD.